(12) United States Patent
Ko

(10) Patent No.: US 12,459,398 B2
(45) Date of Patent: Nov. 4, 2025

(54) BATTERY MANAGEMENT APPARATUS CONFIGURED TO ADJUST A CUT-OFF TIME POINT OF A POWER SUPPLY BASED ON USE INFORMATION OF A REMOTE SERVICE

(71) Applicants: Hyundai Motor Company, Seoul (KR); Kia Corporation, Seoul (KR)

(72) Inventor: Jaeyoon Ko, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 214 days.

(21) Appl. No.: 18/078,479

(22) Filed: Dec. 9, 2022

(65) Prior Publication Data

US 2023/0406152 A1 Dec. 21, 2023

(30) Foreign Application Priority Data

May 20, 2022 (KR) .................. 10-2022-0061898

(51) Int. Cl.
*B60L 58/14* (2019.01)
(52) U.S. Cl.
CPC ........... *B60L 58/14* (2019.02); *B60L 2240/70* (2013.01); *B60L 2240/80* (2013.01)
(58) Field of Classification Search
CPC .. B60L 58/14; B60L 2240/70; B60L 2240/80; B60L 58/12; B60L 53/68; B60L 58/13; B60L 3/0046; B60Y 2200/91; B60Y 2200/92; B60Y 2400/3086; Y02T 10/70; Y02T 10/7072; Y02T 10/72; Y02T 90/40; G06Q 50/40
See application file for complete search history.

(56) References Cited

U.S. PATENT DOCUMENTS

| | | | |
|---|---|---|---|
| 2014/0176085 A1 | 6/2014 | Maruno et al. | |
| 2014/0343831 A1* | 11/2014 | Hosey | H02J 7/0032 324/426 |
| 2017/0050531 A1 | 2/2017 | Genin-Demure et al. | |
| 2017/0206139 A1 | 7/2017 | Braun et al. | |
| 2018/0335825 A1* | 11/2018 | Kim | H04W 52/0235 |
| 2018/0348844 A1* | 12/2018 | Lingutla | G06F 1/3209 |
| 2019/0311307 A1* | 10/2019 | Ramot | G06Q 10/06 |

(Continued)

FOREIGN PATENT DOCUMENTS

| | | |
|---|---|---|
| JP | 6682452 B2 | 4/2020 |
| KR | 10-2020-0029402 A | 3/2020 |
| KR | 10-2020-0094852 A | 8/2020 |

*Primary Examiner* — James J Lee
*Assistant Examiner* — Alexander George Matta
(74) *Attorney, Agent, or Firm* — Morgan, Lewis & Bockius LLP

(57) ABSTRACT

A vehicle receives SoC information of the battery when the vehicle is in a parked state, determines whether a charged amount of the battery is lower than or equal to a preset charged amount based on the received SoC information of the battery, determines whether a current time is included in a use time zone based on use time information of the remote service when it is determined that the charged amount of the battery is lower than or equal to the preset charged amount, adjusts a cut-off time point of power supply of the battery in response to whether the current time is included in the use time zone, and transmits a power supply cut-off command of the battery to the battery management apparatus.

10 Claims, 6 Drawing Sheets

(56) References Cited

U.S. PATENT DOCUMENTS

| | | |
|---|---|---|
| 2020/0139845 A1 | 5/2020 | Henrichs et al. |
| 2020/0242115 A1 | 7/2020 | Choi et al. |
| 2021/0049840 A1 | 2/2021 | Moghtadai et al. |
| 2022/0245748 A1* | 8/2022 | Flossmor ............... G06Q 50/40 |
| 2023/0038882 A1* | 2/2023 | Zhao ..................... H02J 7/0048 |
| 2023/0249581 A1* | 8/2023 | Bowis .................... B60L 58/13 |
| | | 701/22 |

* cited by examiner

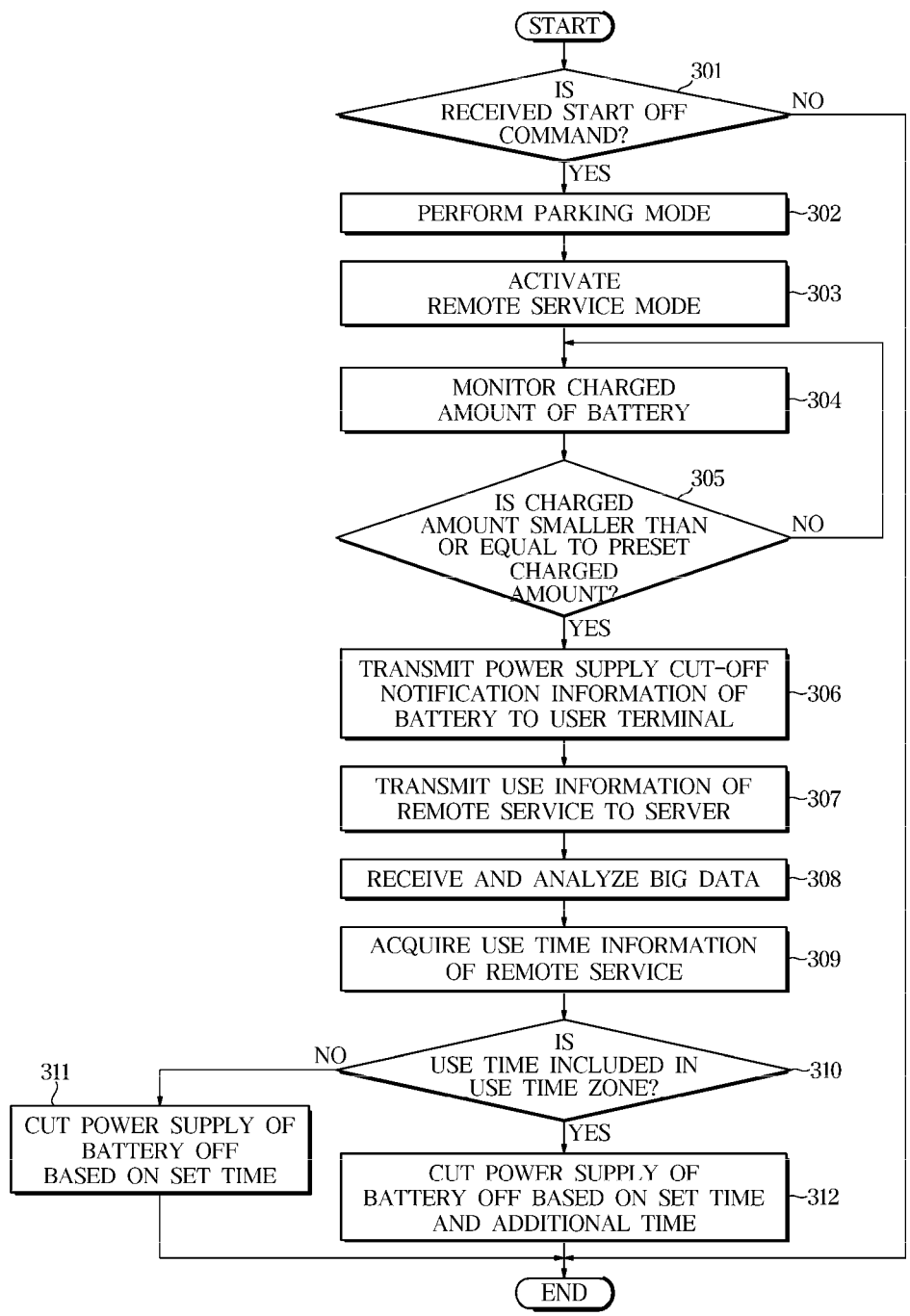

BATTERY MANAGEMENT APPARATUS CONFIGURED TO ADJUST A CUT-OFF TIME POINT OF A POWER SUPPLY BASED ON USE INFORMATION OF A REMOTE SERVICE

CROSS-REFERENCE TO RELATED APPLICATION

The present application claims priority to Korean Patent Application No. 10-2022-0061898, filed on May 20, 2022, the entire contents of which is incorporated herein for all purposes by this reference.

BACKGROUND OF THE PRESENT DISCLOSURE

Field of the Present Disclosure

The present disclosure relates to a battery management device configured to prevent the uncontrollability of a vehicle due to fully discharging of a battery, a vehicle including the same, and a server configured to perform communication with the vehicle.

Description of Related Art

Vehicles include an internal combustion engine vehicle (conventional engine vehicle) configured to generate mechanical power by combusting petroleum fuels such as gasoline and diesel and travels using the mechanical power, an electric vehicle including a re-chargeable battery and a motor and configured to rotate the motor with electricity accumulated in the battery, and drive wheels using the rotation of the motor, a hybrid electric vehicle including an engine, a battery, and a motor and configured to travel by controlling mechanical power of the engine and electric power of the motor, and a hydrogen fuel cell vehicle.

The vehicles include a battery for starting or a battery configured to supply starting and traveling powers. The battery also supplies power for operation to various devices provided inside the vehicle.

The battery of the vehicle supplies power to various electronic devices in the vehicle even when the vehicle is turned off. In other words, when the vehicle is in a state of being parked, the battery is discharged by a dark current flowing through various electronic devices in the vehicle. Furthermore, as time elapses after the vehicle is turned off, a discharge amount of the battery increases.

Conventionally, users could not recognize a discharge situation of the battery in the vehicle. Therefore, after the vehicle is parked, when the starting operation is performed, a problem that the starting may not be completed often occurs.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery management apparatus configured to control an output of power supply cut-off notification information of a battery by monitoring a state of the battery, obtain use time information of a remote service based on big data on the remote service used by a user, and adjust a cut-off time point of the power supply of the battery based on the obtained use time information of the remote service, a vehicle including the same, and a server configured to perform communication with the vehicle.

Additional aspects of the present disclosure will be set forth in part in the description which follows, and in part, will be obvious from the description, or may be learned by practice of the present disclosure.

In accordance with one aspect of the present disclosure, a battery management apparatus includes a voltage sensor configured to detect a voltage of a battery and a management processor communicatively connected to the voltage sensor and configured to receive use time information of a remote service and state information of the vehicle from a first processor provided in the vehicle, obtain state of charge (SoC) information of the battery based on voltage information detected by the voltage sensor when the vehicle is in a parked state, determine whether a charged amount of the battery is lower than or equal to a preset charged amount based on the obtained SoC information of the battery, determine whether a current time is included in a use time zone of the remote service based on the use time information of the remote service when it is determined that the charged amount of the battery is lower than or equal to the preset charged amount, and adjust a cut-off time point of power supply of the battery in response to whether the current time is included in the use time zone of the remote service.

The management processor of the battery management apparatus according to one aspect may adjust a standby time from the current time to the cut-off time point of the power supply of the battery to be longer in a case in which the current time is included in the use time zone of the remote service than in a case in which the current time is not included in the use time zone of the remote service.

The management processor of the battery management apparatus according to one aspect may count a time when the management processor concludes that the current time is not included in the use time zone of the remote service and controls power supply cut-off of the battery when the counted time elapses a set time and count the time when the management processor concludes that the current time is included in the use time zone of the remote service and controls the power supply cut-off of the battery when the counted time elapses the set time and an additional time.

The additional time of the battery management apparatus according to one aspect may be determined using the preset charged amount and a charged amount required for starting the vehicle.

The management processor of the battery management apparatus according to one aspect may transmit the obtained SoC information of the battery to the first processor.

The battery management apparatus according to one aspect may further include a switch connected to the battery. The management processor may control an OFF operation of the switch to cut the power supply of the battery off.

In accordance with another aspect of the present disclosure, a vehicle includes a battery, a memory, a battery management apparatus configured to monitor a state of charge (SOC) value of the battery, and a processor configured to receive SoC information of the battery from the battery management apparatus when the vehicle is in a parked state, determine whether a charged amount of the battery is lower than or equal to a preset charged amount based on the received SoC information of the battery, determine whether a current time is included in a use time zone of a remote service based on use time information of the remote service stored in the memory when it is determined that the charged amount of the battery is lower than or equal to the preset charged amount, adjust a cut-off time point of power supply of the battery in response to whether the current time is included in the use time zone of the remote service, and transmit a power supply cut-off command of the battery to the battery management apparatus.

The processor of the vehicle according to another aspect may adjust a standby time from the current time to the cut-off time point of the power supply of the battery to be longer in a case in which the current time is included in the use time zone of the remote service than in a case in which the current time is not included in the use time zone of the remote service.

The vehicle according to another aspect may further include a communicator. The processor may control the communicator to transmit the received SoC information of the battery to a user terminal, and when it is determined that the charged amount of the battery is lower than or equal to the preset charged amount, control the communicator to transmit power supply cut-off notification information of the battery to the user terminal.

The processor of the vehicle according to another aspect may count a time from a time point when the power supply cut-off notification information of the battery is transmitted when it is determined that the current time is not included in the use time zone of the remote service and transmit the power supply cut-off command of the battery to the battery management apparatus when the counted time elapses a set time, and count the time from the time point when the power supply cut-off notification information of the battery is transmitted when it is determined that the current time is included in the use time zone of the remote service and transmit the power supply cut-off command of the battery to the battery management apparatus when the counted time elapses the set time and an additional time.

The additional time of the vehicle according to another aspect may be determined using the preset charged amount and a charged amount required for starting the vehicle.

The vehicle according to another aspect may further include a switch connected to the battery. The battery management apparatus may control an OFF operation of the switch to cut the power supply of the battery off.

The vehicle according to another aspect may further include a communicator configured to perform communication with a server. The processor may receive the use time information of the remote service from the server and store the received use time information of the remote service in the memory.

The vehicle according to another aspect may further include a communicator configured to perform communication with a server. The processor may receive big data from the server, obtain use information of the remote service based on the received big data, obtain the use time information of the remote service based on the obtained use information of the remote service, and store the obtained use time information of the remote service in the memory.

The vehicle according to another aspect may further include a communicator configured to perform communication with a server. The processor may receive use information of the remote service from the server, obtain the use time information of the remote service based on the obtained use information of the remote service, and store the obtained use time information of the remote service in the memory.

The vehicle according to another aspect may further include a communicator configured to perform communication with a user terminal and a server. The processor may control a remote service mode using the user terminal and transmit use information of the remote service while the remote service mode is performed to the server.

In accordance with yet another aspect of the present disclosure, a server includes a memory, a communicator configured to perform communication with a vehicle and a processor configured to store received use information of a remote service in the memory as big data upon receiving the use information of the remote service performed in the vehicle, obtain the use information of the remote service based on the big data stored in the memory, obtain use time information of the remote service based on the obtained use information of the remote service, and control the communicator to transmit the obtained use time information of the remote service to the vehicle.

The processor of the server yet another aspect may obtain the use time information of the remote service performed when the vehicle is in a parked state from the big data.

The processor of the server yet another aspect may control the communicator to periodically transmit the use time information of the remote service to the vehicle.

The processor of the server yet another aspect may control the communicator to transmit the use time information of the remote service to the vehicle in response to a request for providing the information on the vehicle.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 8 is a control flowchart of a vehicle according to an exemplary embodiment of the present disclosure.

Figure 1:
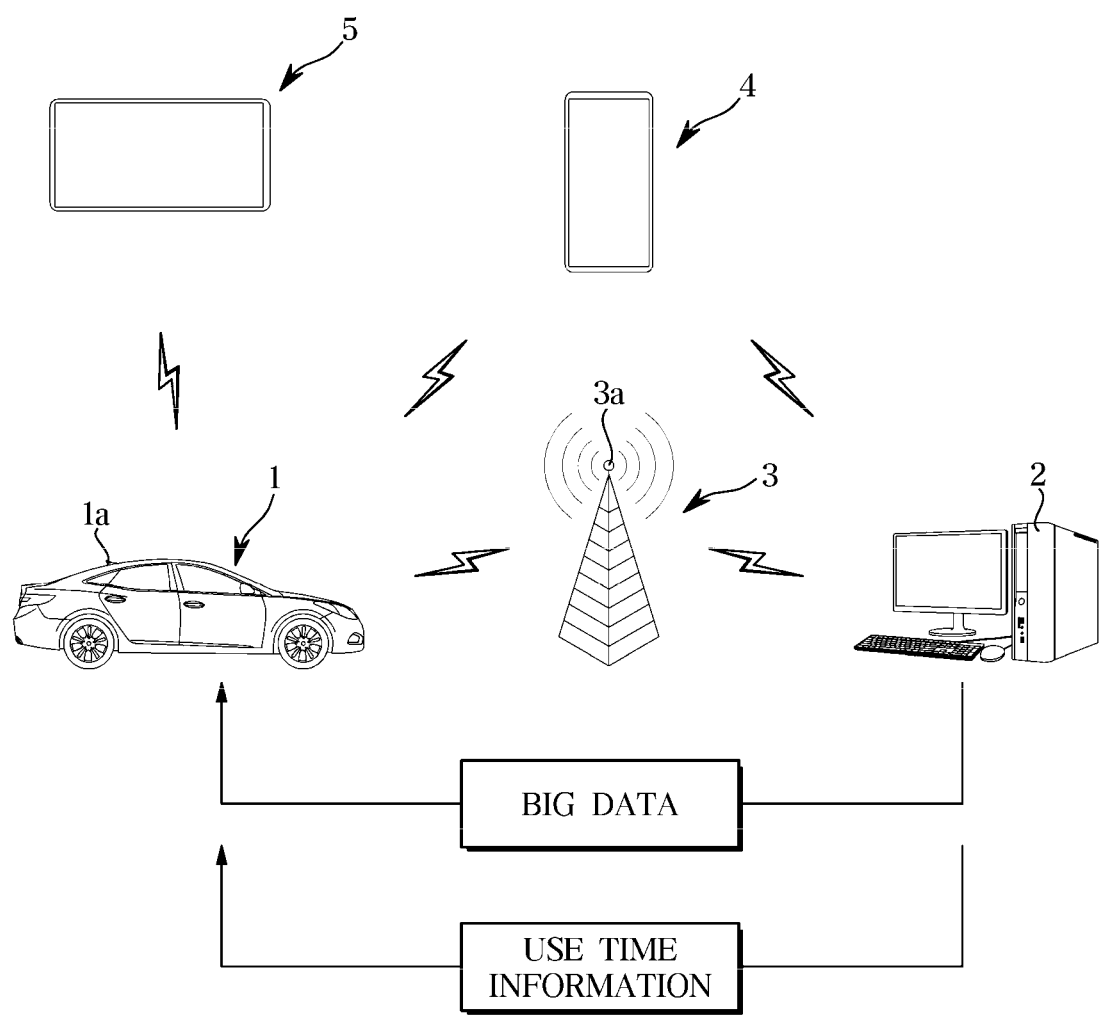
FIG. 1 is an exemplary view of communication of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The same reference numerals refer to the same components throughout the specification. The specification does not describe all elements of the embodiments, and general contents in the art to which the present disclosure pertains or overlapping contents among the exemplary embodiments will be omitted. Terms "unit, module, and device" used in the specification may be implemented in software or hardware, and according to the embodiments, a plurality of "units, modules, and devices" may be implemented as one component or one "unit, module, and device" may also include a plurality of components.

Throughout the specification, when a certain portion is referred to as being "connected" to another portion, it includes not only a case in which the certain portion is directly connected to another portion but also a case in which it is indirectly connected thereto, and the indirect connection includes a connection through a wireless communication network.

Furthermore, when a certain portion is referred to as "including" a certain component, it means that other components may be further included, rather than excluding the other components unless otherwise stated.

Terms such as first and second are used to distinguish one component from another, and the components are not limited by the above-described terms.

The singular expression includes the plural expression unless the context clearly dictates otherwise.

In each operation, identification signs are used for convenience of description, and the identification signs do not describe the order of each operation, and each operation may be performed differently from the specified order unless the context clearly states the specific order.

Hereinafter, an operating principle and embodiments of the present disclosure will be described with reference to the accompanying drawings.

Figure 2:
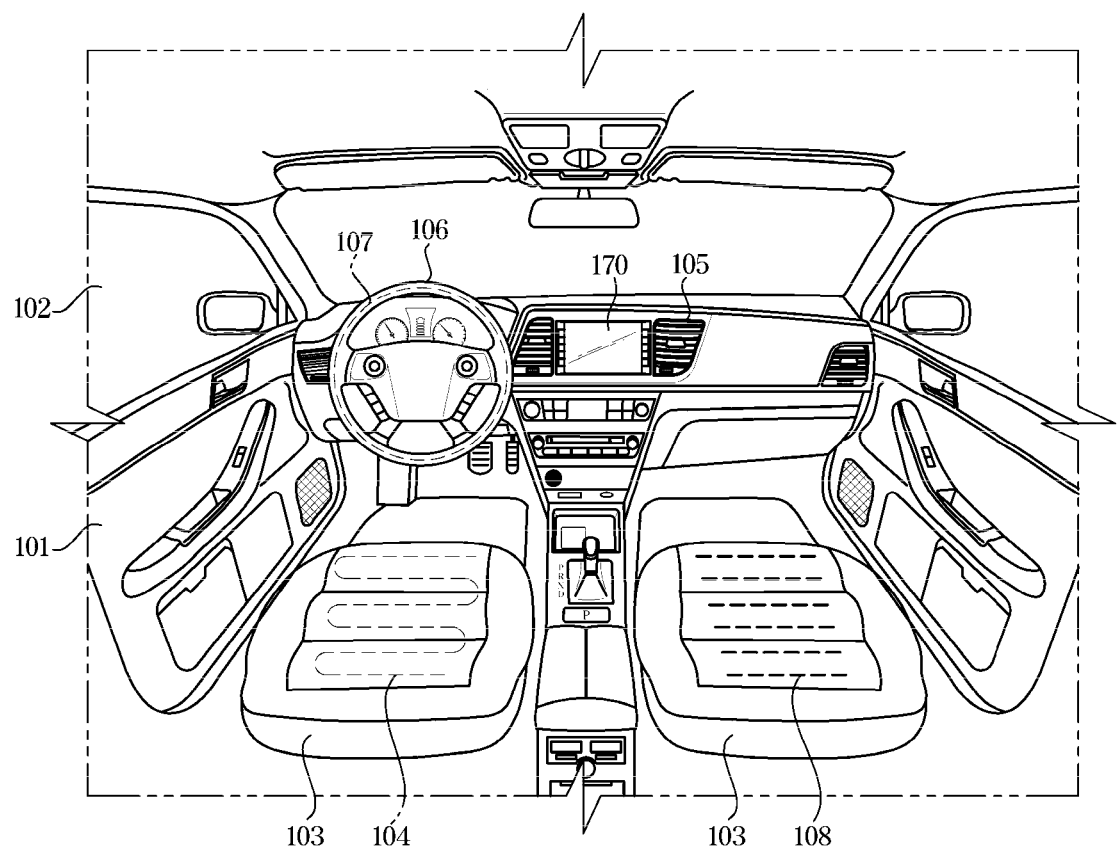
FIG. 2 is an exemplary view of a vehicle according to an exemplary embodiment of the present disclosure.
Figure 3:
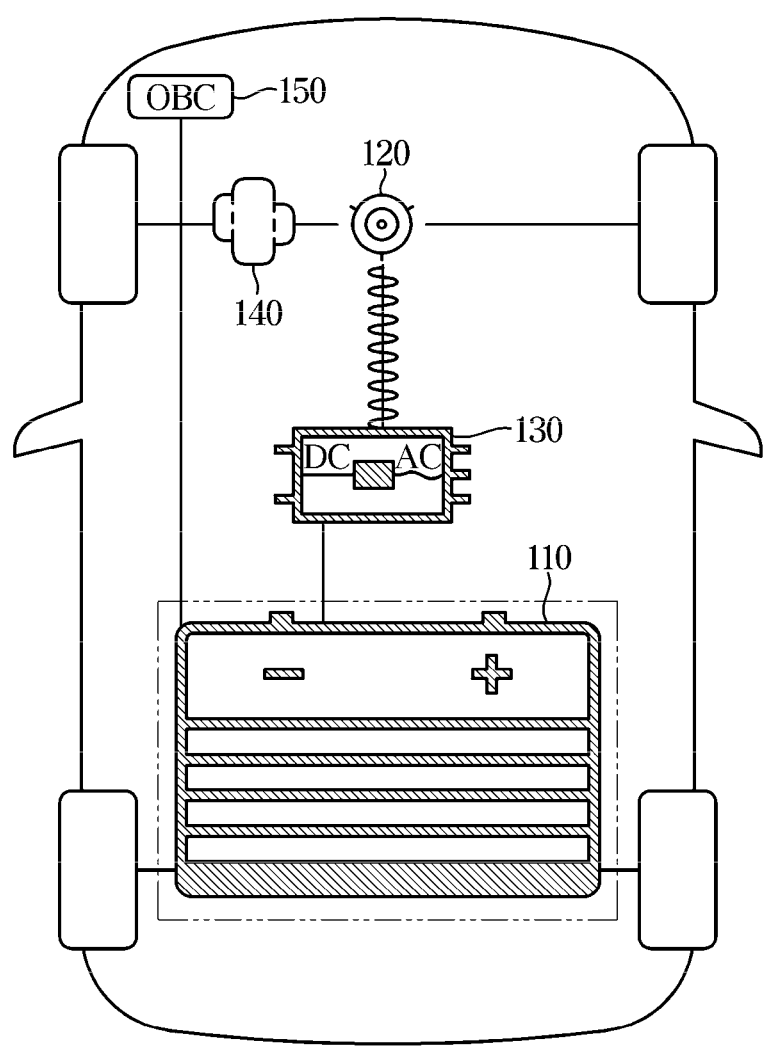
FIG. 3 is an exemplary view of a power device of a vehicle according to an exemplary embodiment of the present disclosure.

FIG. 1 is an exemplary view of communication of a vehicle according to an exemplary embodiment of the present disclosure, FIG. 2 is an exemplary view of a vehicle according to an exemplary embodiment of the present disclosure, and FIG. 3 is an exemplary view of a power device of a vehicle according to an exemplary embodiment of the present disclosure.

FIG. 1 is a view for describing the communication between a vehicle 1 and a server 2, an infrastructure 3, a user terminal 4, and a home terminal 5.

The vehicle 1 may emit electromagnetic waves to the outside through an antenna 1a.

At the present time, the antenna 1a of the vehicle may emit electromagnetic waves corresponding to an electrical signal transmitted from a first processor 190 (see FIG. 4) provided in the vehicle 1.

The vehicle 1 receives electromagnetic waves emitted from at least one of the infrastructure 3, the server 2, and the user terminal 4 through the antenna 1a and converts the received electromagnetic waves into an electrical signal.

The vehicle 1 demodulates the electromagnetic waves received through the antenna 1a to convert the demodulated electromagnetic waves into the electrical signal, generates a control signal corresponding to the converted electrical signal, and utilizes the generated control signal to control the vehicle 1.

The vehicle 1 communicates with the server 2.

Here, the server 2 may be a server provided in his or her own vehicle 1, a service center for managing other vehicles, a manufacturer, a maintenance center, a charging management center, a meteorological agency, a traffic information guidance center, and the like. Furthermore, the server 2 may be an application (i.e., an app) server configured to provide services connected to his or her own vehicle 1 and other vehicles, a telematics server, and an application server related to a temperature.

The vehicle 1 may communicate with the server 2 through the infrastructure 3 on a road.

The vehicle 1 may receive the electromagnetic waves emitted from the infrastructure 3 on the road or emit the electromagnetic waves to the infrastructure 3 on the road.

The infrastructure 3 may receive the electromagnetic waves emitted from the antenna 1a of the vehicle 1 through an antenna 3a, and obtain information provided from the vehicle 1 or generate a control signal using an electrical signal corresponding to the received electromagnetic waves.

The infrastructure 3 may be connected to the external server 2 through a separate cable.

When receiving an electrical signal from the server 2, the infrastructure 3 may convert the received electrical signal into a control signal or information, convert the converted control signal or information into the electromagnetic waves, and emit the converted electromagnetic waves through the antenna 3a. At the instant time, the vehicle positioned around the infrastructure 3 may receive the electromagnetic waves emitted from the infrastructure 3.

The infrastructure 3 may also emit the electromagnetic waves which may be received by only any one vehicle according to a control command of the server 2.

Therefore, the communication (vehicle-to-infrastructure (V2I) communication) between the vehicle 1 and the infrastructure 3 (i.e., the structure) may be performed.

Furthermore, the vehicle 1 may also perform the communication (vehicle-to-vehicle (V2V) communication) with other vehicles and perform the communication (vehicle-to-pedestrian (V2P) communication) with the user terminal 4.

The vehicle 1 may receive big data from the server 2 and adjust a cut-off time point of the power supply of the battery based on the received big data when the vehicle is in a parked state.

The big data may include use information of a remote service used by a user. Here, the remote service is also referred to as a connected vehicle service.

The remote service provides information received through the server 2 to the user through a vehicle terminal 170 (see FIG. 4), provides a user input received in the vehicle 1 and operation information of the vehicle 1 to the server 2 or the user terminal 4, or controls the vehicle 1 based on a user input received through the user terminal 4.

The remote service is configured to control various electronic devices provided in the home or displays operation information of various electronic devices in the home through the vehicle terminal 170 (see FIG. 4) for a vehicle by transmitting control information of various electronic devices provided in the home to the home terminal 5 from the vehicle.

The remote service may be performed through an application provided on the vehicle terminal 170 or an application provided on the user terminal 4.

In the exemplary embodiment of the present disclosure, the use information of the remote service is information for remotely controlling an operation of at least one of the plurality of electronic devices in the vehicle using the user terminal 4 and may include control information, use time information, and use date information of the at least one electronic device.

The use time information may include use start time point information and use end time point information.

One user terminal 4 or two or more user terminals 4 may be provided.

The use information of the remote service may be information which integrates the use information using the remote service with respect to one vehicle 1 through the one user terminal 4 or two or more user terminals 4.

The vehicle 1 may transmit the use information of the remote service to the server 2 and transmit power supply cut-off notification information of a battery to the user terminal 4.

The user terminal 4 may display the power supply cut-off notification information of the battery. The user terminal 4 may also display state information of the battery.

Here, the power supply cut-off notification information of the battery may be displayed on a display of the user terminal 4 through the application provided in the user terminal 4. The application may be an application program providing the remote service for remotely controlling the vehicle 1.

The user terminal 4 may be implemented as a computer or a portable terminal which may be connected to the vehicle 1 through a network. Here, the computer may include, for example, a notebook, a desktop, a laptop, a tablet PC, a slate PC, and the like provided with a web browser, and the portable terminal may include, for example, any type of a handheld-based wireless communication device, such as a personal communication system (PCS), global system for mobile communication (GSM), a personal digital cellular (PDC), a personal handyphone system (PHS), a personal digital assistant (PDA), international mobile telecommunication (IMT)-2000, a code division multiple access (CDMA)-2000, a W-CDMA, a wireless broadband Internet (WiBro) terminal, or a smart phone and a wearable device such as a watch, a ring, a bracelet, a anklet, necklace, glasses, a contact lens, or a head-mounted-device (HMD) as a wireless communication device which ensures portability and mobility.

The vehicle 1 may include a body including an interior and an exterior and a chassis in which mechanical devices required for traveling are provided as the remaining parts except for the body.

The exterior of the body includes a front panel, a bonnet, a roof panel, and a rear panel.

As shown in FIG. 2, the exterior of the body includes front, rear, left and right doors 101 and window glasses 102 (also referred to as windows) provided on the front, rear, left and right doors 101 to be opened and closed.

The exterior of the body includes a side mirror configured to provide a driver with a rear view of the vehicle 1 and a lamp configured to allow the driver to easily check surrounding information while keeping an eye on a front view and function as a signal for and communication with other vehicles and pedestrians.

The exterior of the body includes the antenna 1a configured to perform a wireless vehicle network (vehicle-to-everything (V2X)), such as the communication with other vehicles (V2V), the communication with the user terminal (V2P), and the communication with the infrastructure 3 (V2I).

The antenna 1a may be provided on a roof panel 113 of the vehicle. Furthermore, the antenna 1a may also be provided on a rear windshield glass of the vehicle.

As shown in FIG. 2, the interior of the body may include a seat 103 on which a passenger sits, a dashboard, and an instrument panel (i.e., a cluster) disposed on the dashboard and on which a tachometer, a speedometer, a coolant thermometer, a fuel gauge, a turn indicator light, a high beam indicator, a warning light, a seat belt warning light, an odometer, a shift lever indicator light, a door open warning light, an engine oil warning light, and a low fuel warning light are disposed.

The interior of the body may include a seat heating wire 104 provided on the seat 103 and an air conditioner 105 including a ventilator and a control plate disposed on a center fascia and configured to perform heat exchange with air inside the vehicle.

A steering wheel 106 configured to change a traveling direction of the vehicle may be provided inside the vehicle, and a wheel heating wire 107 may be further provided on the steering wheel 106.

The vehicle may further include a ventilation device 108 provided on the seat 103.

The chassis of the vehicle is a frame configured to support the body, and the chassis may be provided with a wheel disposed on each of the front, rear, left and right sides, a power device configured to apply a drive force to the front, rear, left and right wheels, a steering device, a braking device configured to apply a braking force to the front, rear, left and right wheels, and a suspension device.

In the exemplary embodiment of the present disclosure, an electric vehicle will be described for example.

As shown in FIG. 3, the power device of the vehicle includes a battery 110, a motor 120, an inverter 130, a reducer 140, and a charging circuit 150.

The battery 110 supplies a drive force to the vehicle by generating a high-voltage current.

The battery 110 may also be electrically connected to electronic devices, such as convenience devices and additional devices, to supply drive power to the respective electronic devices.

The battery 110 may be charged with power supplied from a charger disposed in a parking lot or a charging station. In other words, the battery 110 may be a chargeable and dischargeable battery.

Upon regenerative braking of the battery 110, the battery 110 may be charged using power generated by the motor 120 configured to perform a power generation function.

The vehicle may further include a power converter.

The power converter is configured to convert power supplied from the outside thereof into power for charging the battery 110 and supplies the converted power to the battery 110. Here, the power supplied from the outside thereof may be power of the charging station.

The motor 120 drives the wheel by generating a rotation force using electrical energy of the battery 110 and transmitting the generated rotation force to the wheels.

When a start button (or a booting button) is turned on, the motor 120 generates a maximum torque by receiving a maximum current.

The motor 120 may also operate as a generator under energy regeneration conditions by braking, deceleration, downhill road traveling, or low-speed traveling to charge the battery 110.

The inverter 130 drives the motor 120 in response to a control command of the first processor 190. The inverter 130 converts the power of the battery 110 into the drive power of the motor 120.

When the drive power of the motor 120 is output, the inverter 130 outputs the drive power of the motor 120 based on a target traveling speed according to a user command. Here, the drive power of the motor 120 may vary depending on a switching signal for outputting a current corresponding to the target traveling speed and a switching signal for outputting a voltage corresponding to a target vehicle speed. In other words, the inverter 130 may include a plurality of switching elements.

The inverter 130 may also transmit the power generated from the motor 120 upon regenerative braking to the battery 110. In other words, the inverter 130 may also perform a function of changing a direction and output of the current between the motor 120 and the battery 110.

The reducer 140 decreases a speed of the motor 120 and transmits a rotation force increasing the torque of the motor 120 to the wheels.

The charging circuit 150 converts external commercial power (AC power) into rectified power and DC power and transmits the rectified power and DC power to the battery 110. For example, the charging circuit 150 may include an AC rectifier, a power factor correction (PFC) device, a converter, and a capacitor.

Figure 4:
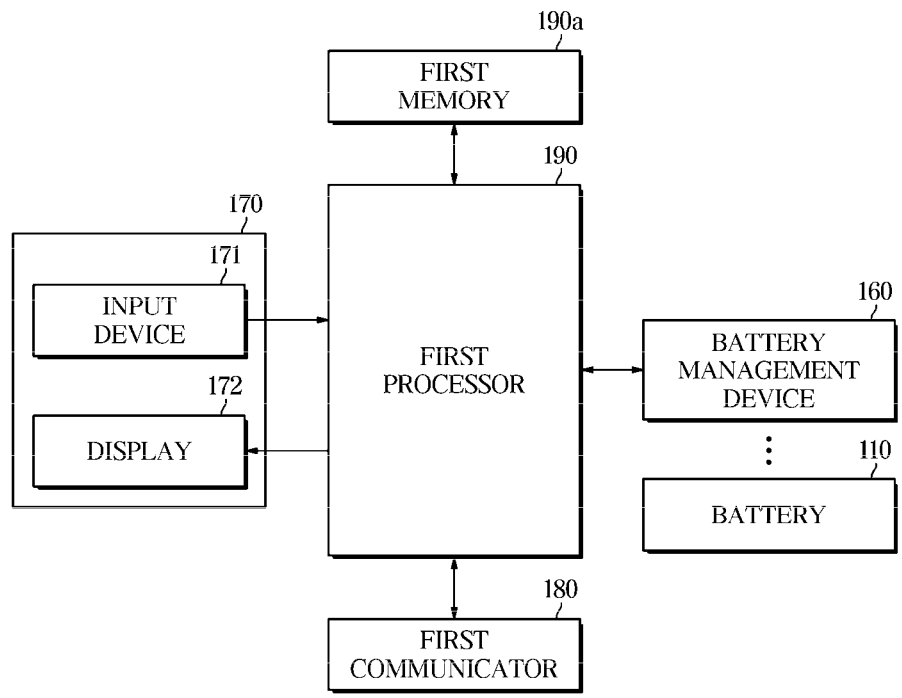
FIG. 4 is a control configuration diagram of a vehicle according to an exemplary embodiment of the present disclosure.

FIG. 4 is a control configuration diagram of a vehicle according to an exemplary embodiment of the present disclosure, which will be described with reference to FIG. 5 and FIG. 6.

As shown in FIG. 4, the vehicle 1 includes the battery 110, the battery management device 160, the vehicle terminal 170, a first communicator 180, the first processor 190, and a first memory 190a.

To differentiate between the components of the vehicle 1 and the components of the server 2, the communicator, the processor, and the memory provided in the vehicle 1 are denoted by a first, and the communicator, the processor, and the memory provided in the server 2 are denoted by a second.

A description of the battery 110 will be omitted because it has been described with reference to FIG. 3.

The battery management device 160 monitors a state of charge (SOC) value of the battery 110 and transmits SoC information on the monitored SoC to the first processor 190.

Figure 5:
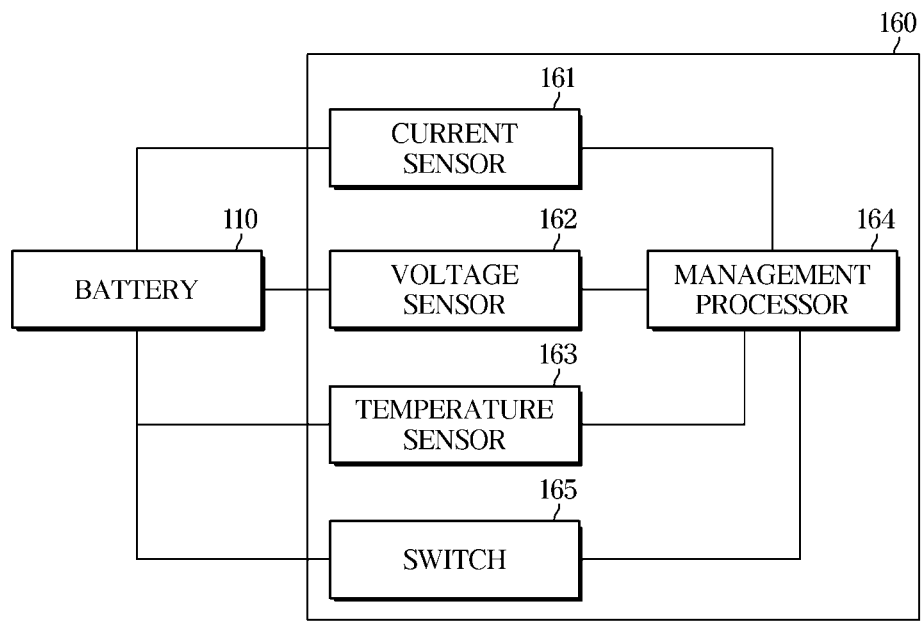
FIG. 5 is a control configuration diagram of a battery management device provided in a vehicle according to an exemplary embodiment of the present disclosure.

As shown in FIG. 5, the battery management device 160 includes a current sensor 161, a voltage sensor 162, a temperature sensor 163, and a management processor 164 and further includes a switch 165.

The current sensor 161 detects a current flowing in the battery 110.

The voltage sensor 162 detects a voltage of an output terminal of the battery 110.

The temperature sensor 163 detects a temperature of the battery 110.

The current sensor may be provided for each cell or module of the battery.

The voltage sensor and the temperature sensor may also be provided for each cell or module of the battery.

The management processor 164 monitors the SOC value of the battery 110 based on current information of the battery detected by the current sensor 161.

The management processor 164 may also monitor the SOC value of the battery based on the current information of the battery detected by the current sensor 161 and voltage information detected by the voltage sensor 162.

The management processor 164 may also monitor the SOC value of the battery based on the current information of the battery detected by the current sensor 161, the voltage information detected by the voltage sensor 162, and temperature information detected by the temperature sensor 163.

The management processor 164 may also monitor the SOC value of the battery based on the current, information, voltage information, and temperature information of each cell of the battery.

The management processor 164 may monitor the SOC value of the battery based on the current information, voltage information, and temperature information of each module of the battery.

The management processor 164 may obtain charged amount information of the battery corresponding to the current information, voltage information, and temperature information of the battery from a pre-stored table.

In the pre-stored table, the charged amount information of the battery may correspond to and match with correlation with the current information, voltage information, and temperature information of the battery.

The management processor 164 outputs the SoC information on the monitored SOC value of the battery to the first processor 190. Here, the SOC value of the battery may include the charged amount information of the battery.

The management processor 164 may supply the power of the battery or cut the power supply of the battery off in response to the control command of the first processor 190.

The management processor 164 may receive the big data from the server 2, obtain the use time information of the remote service based on the received big data, and adjust a cut-off time point of the power supply of the battery based on the obtained use time information of the remote service.

The management processor 164 may receive the use time information of the remote service from the server 2 and adjust the cut-off time point of the power supply of the battery based on the received use time information of the remote service.

A configuration of the management processor 164 configured to adjust the cut-off time point of the power supply of the battery may be the same as that of the first processor 190 to be described below. Therefore, a detailed description of the configuration of the management processor 164 configured to adjust the cut-off time point of the power supply of the battery will be omitted.

The battery management device 160 may further include the switch 165 connected to the battery, and the management processor 164 may control an ON operation of the switch 165 to supply the power of the battery and control an OFF operation of the switch 165 to cut the power supply of the battery 110 off.

The management processor 164 may be implemented by a memory configured to store data on an algorithm for controlling the operations of the components in the battery management device 160 or a program reproducing the algorithm and a processor configured to perform the above-described operations using the data stored in the memory. In the instant case, the memory and the processor may be implemented as separate chips, respectively. Alternatively, the memory and the processor may also be implemented as a single chip.

The management processor 164 of the battery management device 160 and the first processor 190 may also be implemented as one processor.

Meanwhile, each component of the battery management device shown in FIG. 5 refers to software and/or hardware components, such as a field programmable gate array (FPGA) and an application specific integrated circuit (ASIC).

The vehicle terminal 170 may be provided on the dashboard in a buried or mounted type.

The vehicle terminal 170 outputs information on various functions performed in the vehicle and information on various functions for user convenience.

The vehicle terminal 170 may perform the remote service. The vehicle terminal 170 may communicate with the server 2, communicate with the user terminal 4, and communicate with the home terminal 5. The home terminal 5 may be a terminal for controlling various electronic devices provided in the home and displaying the operation information of various electronic devices in the home.

Various electronic devices provided in the home may include a boiler, an air conditioner, a lighting device, a gas valve of a gas range, a television, an audio system, and the like.

The vehicle terminal 170 may include an application for performing the remote service.

The vehicle terminal 170 may transmit current position information and destination information to the server 2 when performed in a navigation mode and output navigation information based on route information received from the server 2. The route information received from the server 2 may be changed based on traffic information while the vehicle travels.

When the vehicle is an autonomous vehicle, the vehicle may also control autonomous traveling based on the navigation information of the vehicle terminal 170.

The vehicle terminal 170 may output news information and weather information received from the server 2 and display the operation information of the various electronic devices in the home received through the home terminal 5.

The vehicle terminal 170 may also receive the destination information from the user terminal 4.

When the vehicle is in a parked state or a stopped state, the vehicle terminal 170 may receive at least one of a start ON command, a start OFF command, a door lock command, a door unlock command, a window open command, a window close command, a seat heating wire ON command, a seat heating wire OFF command, a ventilation device ON command, a ventilation device OFF command, a wheel heating wire ON command, a wheel heating wire OFF command, an air conditioner ON command, and an air conditioner OFF command from the user terminal 4.

When the vehicle is in the parked state or the stopped state, the vehicle terminal 170 may further receive at least one of temperature information of the seat heating wire, temperature information of the wheel heating wire, target temperature information and target blowing information of the air conditioner, and target blowing information of a ventilation seat.

The vehicle terminal 170 may transmit the information received from the user terminal 4 to the first processor 190.

The vehicle terminal 170 may include a voice recognition function and transmit voice recognition information to the first processor 190.

The vehicle terminal 170 may also receive operation commands for functions which may be performed by the vehicle terminal 170 and various functions for user convenience.

The vehicle terminal 170 may include a display 172 and further include an input device 171.

The vehicle terminal 170 may include a display panel as the display 172 and further include a touch panel as the input device 171. In other words, the vehicle terminal 170 may include only the display panel and also include a touch screen in which the touch panel is integrated with the display panel. When the vehicle terminal 170 is implemented as the touch screen, the vehicle terminal 170 may directly receive a user's operation command through the touch panel.

When the vehicle terminal 170 is implemented as only the display panel, a button displayed on the display panel may be selected using the input device provided on a head unit or a center fascia.

The input device 171 receives the user input.

The input device 171 receives an operation command of at least one of the functions which may be performed in the vehicle terminal 170. The functions which may be performed in the vehicle terminal 170 may include a remote service function, a navigation function, a phone call function, a broadcast output function, an audio function, a radio function, an Internet function, a communication function with the user terminal 4, and a communication function with the home terminal 5.

The input device 171 may also receive the destination information for the navigation mode.

The display 172 displays information on a function performed in the vehicle or the vehicle terminal 170.

For example, the display 172 may display information on a phone call, display information on contents output through the user terminal 4, or also display information on music reproduction and also display external broadcast information.

When the navigation mode is performed, the display 172 may display a route from a current position to a destination and also display route guide information.

The display 172 may also display the state information of the battery 110 and also display current SoC information of the battery 110.

The display 172 may display remote service information when the remote service function is performed.

The display 172 may also display communication state information with the user terminal 4 and the server 2. In other words, the display 172 may also display available communication and unavailable communication information with the server 2 and available communication and unavailable communication information with the vehicle terminal 170.

The communicator 180 communicates with at least one of the server 2, the infrastructure 3, and the user terminal 4.

The communicator 180 transmits various types of information transmitted from the infrastructure 3, the user terminal 4, and the server 2 to the first processor 190. Various types of information transmitted from the server 2 may include the big data.

The communicator 180 may transmit the use information of the remote service to the server 2 based on the control command of the first processor 190 and transmit the power supply cut-off notification information of the battery to the user terminal 4 based on the control command of the first processor 190.

The communicator 180 may also transmit the current position information and the destination information to the server 2 based on the control command of the first processor 190.

The communicator 180 may also transmit home control information corresponding to the user input to the home terminal 5 based on the control command of the first processor 190.

The communicator 180 may include one or more components configured to perform communication with the in-vehicle components and various external devices and include, for example, at least one of a short-range communication module, a wired communication module, and a wireless communication module.

The short-range communication module may include any short-range communication module configured to transmit and receive signals using a wireless communication network in a short range, such as a Bluetooth module, an infrared communication module, a radio frequency identification (RFID) communication module, a wireless local access network (WLAN) communication module, a near-field communication (NFC) module, or a ZigBee communication module.

The wired communication module may include not only any wired communication module, such as a controller area network (CAN) communication module, a local area network (LAN) module, a wide area network (WAN) module, or a value added network (VAN) module, but also any cable communication module, such as a universal serial bus (USB), a high definition multimedia interface (HDMI), a digital visual interface (DVI), a recommended standard 232 (RS-232), a power line communication, or a plain old telephone service (POTS).

The wired communication module may further include a local interconnect network (LIN).

In addition to the Wi-Fi module and the wireless broadband module, the wireless communication module may include a wireless communication module configured to support any wireless communication method, such as GSM, CDMA, wideband code division multiple access (WCDMA), universal mobile telecommunications system (UMTS), time division multiple access (TDMA), and long term evolution (LTE).

When receiving the start ON command (or the booting ON command), the first processor 190 may receive the SoC information of the battery from the battery management device 160 and control the vehicle terminal 170 or the cluster to display the received SoC information of the battery.

The first processor 190 may periodically obtain the SoC information of the battery while the vehicle travels and control the vehicle terminal 170 or the cluster to display the obtained SoC information of the battery. Here, the SoC information of the battery may include a charged amount of the battery.

When the vehicle is in a traveling state, the first processor 190 may check the user's driving intention based on pressure information corresponding to the press of an accelerator pedal or a brake pedal and control an operation of at least one of the motor 120, the inverter 130, the reducer 140, and the battery 110 in response to the checked user's driving intention.

When it is determined that the navigation mode has been selected, the first processor 190 checks the destination information received through the input device 171, obtains current position information of a global positioning system (GPS) receiver as departure information, searches for a route from the departure to the destination based on the departure information and the destination information, and controls the display 172 to display route information on the retrieved route.

The first processor 190 may also transmit the departure information and the destination information to the server 2 and receive the route information from the server 2.

The first processor 190 may communicate with at least one of the server 2, the infrastructure 3, and the user terminal 4 in response to the ON command of the remote service mode while the vehicle travels.

The first processor 190 may also control the first communicator 180 to communicate with the home terminal in response to the ON command of the remote service mode while the vehicle travels.

The first processor 190 may control the display 172 to display the news information received from the server 2 in response to a news provision mode while the remote service mode is performed, receive the route information from the server 2 in response to the navigation mode, and control the display 172 to display the navigation information based on the received route information.

Here, the navigation information may include map information, route information, departure information, current position information, destination information, road environment information, and the like.

The first processor 190 may control the first communicator 180 to transmit control information input to the input device 171 to the home terminal in response to the home control mode while the remote service mode is performed and control the display 172 to display the operation information of various electronic devices in the home received from the home terminal.

The first processor 190 may control the first communicator 180 to transmit various use information through the remote service mode while the vehicle travels to the server 2.

When receiving the start OFF command, the first processor 190 may obtain the SoC information of the battery and control at least one of the display 172 and the cluster to display the obtained SoC information of the battery.

When receiving the start OFF command, the first processor 190 may control the battery management device 160 to supply power to a plurality of electronic devices based on preset option information.

The preset option information may include identification information on an electronic device which needs to supply power when the vehicle is in the parked state.

The first processor 190 may control the battery management device 160 to monitor the SOC value of the battery when the vehicle is in the parked state.

The first processor 190 may control the activation of the remote service mode when the vehicle is in the parked state.

The first processor 190 may determine whether the charged amount of the battery is lower than or equal to a preset charged amount based on the received SoC information of the battery when receiving the SoC information of the battery from the battery management device 160 and control the first communicator 180 to transmit the power supply cut-off notification information of the battery to the user terminal 4 when it is determined that the charged amount of the battery is lower than or equal to the preset charged amount. At the instant time, the user terminal 4 may receive the power supply cut-off notification information of the battery and display the received power supply cut-off notification information of the battery.

The power supply cut-off notification information of the battery may include guide information for guiding the power supply cut-off of the battery and time information on the power supply cut-off of the battery.

The first processor 190 may receive the big data on the use of the remote service through the server 2, analyze the received big data to obtain the use information of the remote service used by the user, and obtain the use time information of the remote service from the obtained use information.

The first processor 190 may also transmit provision request information of the big data to the server 2 when the charged amount of the battery is lower than or equal to the preset charged amount while the vehicle is parked and receive the big data through the server 2.

When analyzing the received big data, the first processor 190 may analyze the use time of the remote service used by the user when the vehicle is in the parked state.

The first processor 190 may also receive the use time information of the remote service through the server 2.

The first processor 190 may also transmit provision request information of the use time information to the server 2 when the charged amount of the battery is lower than or equal to the preset charged amount while the vehicle is parked and then receive the use time information from the server 2.

The first processor 190 may also transmit the use time information of the remote service to the battery management device 160. At the instant time, the battery management device 160 may adjust the cut-off time point of the power supply of the battery based on the use time information of the remote service.

When obtaining the use time information from the big data received through the server 2 or receiving the use time information through the server 2, the first processor 190 may obtain a use time zone when the remote service is used based on the use time information.

The use time zone when the remote service is used may be a time when the remote service is used a preset number of times or more for a preset period or may range from a time point before a predetermined time period from the use time to a time point after the predetermined time period from the use time.

For example, when the preset period is a week and the preset number of times is 3, the first processor 190 checks the time when the remote service is used 3 or more times a week, and when the checked time is 1:00 PM, the use time zone may be 1:00 PM.

For another example, when the preset period is a week, the preset number of times is 3, and the certain time is 30 minutes, the first processor 190 checks the time when the remote service is used 3 or more times a week, and when the checked time is 1:00 pm, the use time zone may be a time before 30 minutes from 1:00 PM and a time after 30 minutes from 1:00 PM. In other words, the use time zone may be from 12:30 pm to 1:30 pm.

Figure 6:
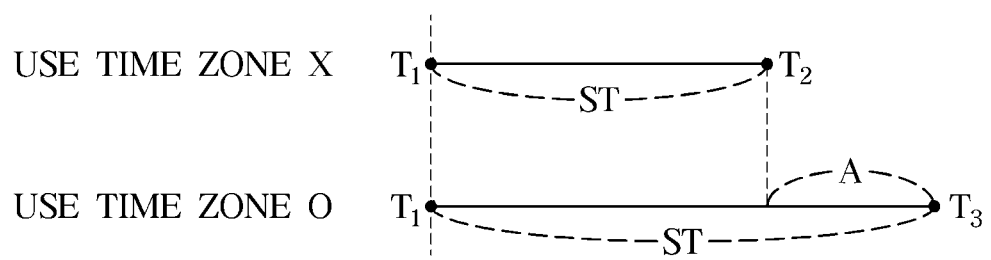
FIG. 6 is an exemplary diagram of a transmission time point of power supply cut-off notification information of a battery and a power supply cut-off time point of the battery of a vehicle according to an exemplary embodiment of the present disclosure.

As shown in FIG. 6, the first processor 190 determines whether the current time is included in the use time zone based on the current time information and the use time information, counts the time from a current time point T1 when it is determined that the current time is not included in the use time zone, and transmits the power supply cut-off command of the battery to the battery management device 160 at a time point T2 when the counted time elapses a set time ST.

As shown in FIG. 6, when it is determined that the current time is included in the use time zone, the first processor 190 transmits the power supply cut-off command of the battery to the battery management device 160 at a time point T3 when an additional time A elapses from the set time ST from the current time point T1.

Here, the additional time A may be determined in response to an amount of power required for starting the vehicle (i.e., a required charged amount). In other words, the additional time A may be a time required for consuming the charged amount corresponding to a difference between the preset charged amount and the required charged amount.

The time required for consuming the charged amount may be obtained from the charged amount information of the battery, the current information of the battery, the voltage information of the battery, the temperature information of the battery, and a pre-stored discharge output map.

The first processor 190 may adjust a standby time until the cut-off time point of the power supply of the battery to be longer in a case in which the current time is included in the use time zone of the remote service than in a case in which the current time is not included in the use time zone.

Furthermore, the first processor 190 may count the time from the current time point T1 when it is determined that the current time is not included in the use time zone of the remote service, determine whether the counted time has elapsed the set time ST, also directly control the battery 110 to cut power supply of the battery off at the time point T2 when the counted time elapses the set time ST when it is determined that the counted time has elapsed the set time ST, and also directly control the battery 110 to cut the power supply of the battery off at the time point T3 when the additional time A elapses from the set time ST from the current time point T1 when it is determined that the current time is included in the use time zone.

Therefore, the vehicle can minimize the restriction of the use of the remote service in the time zone when the user frequently utilizes the remote service by adjusting the time point when the power supply of the battery is cut off based on the big data on the use of the remote service.

The vehicle can prevent the power supply of the battery from being cut off in the time zone when the user frequently utilizes the remote service, so that it is possible for the user to start the vehicle without difficulty.

The first processor 190 may control the operation of at least one electronic device in response to various control commands received from the user terminal 4 when the vehicle is in the parked state.

For example, the first processor 190 may control the start attempt when receiving the start ON command from the user terminal 4 when the vehicle is in the parked state, control the door to be unlocked when receiving the door unlock command from the user terminal 4, control the ON operation of the air conditioner when receiving the ON command and target temperature information of the air conditioner from the user terminal 4, and control the operation of the air conditioner so that a temperature of the air inside the vehicle reaches a target temperature.

When receiving the control command of at least one electronic device from the user terminal 4 when the vehicle is in the parked state, the first processor 190 may confirm the date and time when receiving the control command of the at least one electronic device, store the checked date and time as the use time information of the remote service, store the control command together as the control information, and also store identification information of the user terminal 4 transmitting the control command together.

The first processor 190 may control the first communicator 180 to transmit the use information of the remote service for the remote service mode while the vehicle is parked to the server 2.

The use information of the remote service may include the control information, the use time information, and the user terminal identification information.

The first processor 190 may also transmit the use information of the remote service while the vehicle is parked to the server 2 at the time point when the vehicle is turned on, transmit the use information of the remote service while the vehicle is parked to the server 2 in a certain period, and transmit the use information of the remote service while the vehicle is parked to the server 2 in response to the user input.

The first processor 190 may also store the use information of the remote service. At the instant time, the first processor 190 may also obtain the use time information of the remote service based on the stored use information of the remote service and store the obtained use time information of the remote service. Thereafter, when the vehicle is in the parked state and the charged amount of the battery is lower than or equal to the preset charged amount, the first processor 190 may also adjust the cut-off time point of the power supply of the battery based on the stored use time information of the remote service.

The first processor 190 may be implemented by a memory configured to store data on an algorithm for controlling the operations of the in-vehicle components or a program for reproducing the algorithm and a processor configured to perform the above-described operations using the data stored in the memory. In the instant case, the memory and the processor may be implemented as separate chips, respectively. Alternatively, the memory and the processor may also be implemented as a single chip.

The memory 190a stores the big data provided from the server 2.

The big data may include the use information of the remote service.

The memory 190a may also store a discharge output map of the battery.

The discharge output map includes the charged amount information, which is discharged, matching the charged amount information of the battery, the current information of the battery, the voltage information of the battery, and the temperature information of the battery.

The memory 190a may store vehicle identification information, user identification information for each user, and the user terminal identification information for each user and also store home terminal identification information.

The memory 190a may be implemented as at least one of non-volatile memory devices, such as a cache, a read only memory (ROM), a programmable ROM (PROM), an erasable programmable ROM (EPROM), an electrically erasable programmable ROM (EEPROM), and a flash memory, volatile memory devices, such as a random access memory (RAM), and storage media, such as a Hard Disk Drive (HDD) and a CD-ROM, but the present disclosure is not limited thereto.

Meanwhile, each component shown in FIG. 4 and FIG. 5 refers to software and/or hardware components, such as a FPGA and an ASIC.

Figure 7:
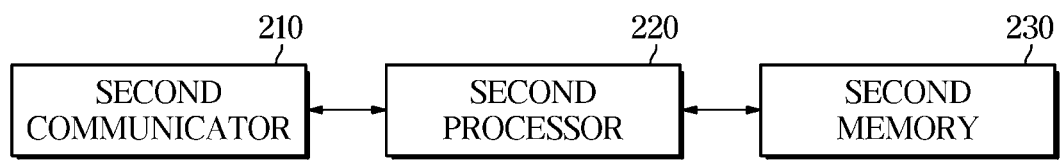
FIG. 7 is a control configuration diagram of a server configured to perform communication with a vehicle according to an exemplary embodiment of the present disclosure.

FIG. 7 is a control configuration diagram of a server configured to perform communication with a vehicle according to an exemplary embodiment of the present disclosure.

The server 2 includes a second communicator 210, a second processor 220, and a second memory 230.

The second communicator 210 may communicate with the vehicle 1.

The second communicator 210 may receive the vehicle information, the user terminal information, and the user information when communicating with the vehicle 1 and receive the use information of the remote service.

The vehicle identification information may include a communication serial number of the vehicle, a registration number of the vehicle, an owner's name of the vehicle, user residence information, and the like.

The user terminal identification information may include a user's name, an identification number of the terminal, a communication serial number of the terminal, a model name of the terminal, and the like.

The second communicator 210 may include a wired communication module and a wireless communication module. Because the types of the wired communication module and the wireless communication module are the same as those of the first communicator, descriptions thereof will be omitted.

The second communicator 210 may communicate with the vehicle 1 and the user terminal 4 through the infrastructure 3.

The second communicator 210 may receive the use information of the remote service from the vehicle and transmit the received use information of the remote service to the second processor 220.

The second communicator 210 may transmit the big data, the use information of the remote service, or the use time information of the remote service to the vehicle 1 in response to a control command of the second processor 220.

The second processor 220 may also store the use information of the remote service received from the vehicle, generate the big data based on the accumulated and stored use information of the remote service, and control the storage of the generated big data.

The second processor 220 may transmit the big data stored in the second memory to the vehicle 1 in response to the provision request for the big data.

The second processor 220 may obtain the use information of the remote service used by the user by analyzing the big data and transmit the obtained use information to the vehicle 1 in response to the provision request for the use information of the remote service.

The second processor 220 may obtain the use information of the remote service used by the user by analyzing the big data, obtain the use time information of the remote service from the obtained use information, and transmit the obtained use time information of the remote service to the vehicle 1 in response to the request for providing the use time information of the remote service.

In other words, the second processor 220 may also transmit the big data, the use information of the remote service, or the use time information of the remote service to the vehicle in response to the information provision request of the vehicle 1.

The second processor 220 may also periodically transmit the big data, the use information of the remote service, or the use time information of the remote service to the vehicle.

The second processor 220 may periodically update the big data.

When receiving the current position information and destination information of the vehicle from the vehicle, the second processor 220 may also search for a route based on the current position information and the destination information and transmit route information on the retrieved route to the vehicle.

The second processor 220 may also transmit news information to the vehicle 1 in response to a news provision request.

The second memory 230 may store the registered user identification information and the vehicle identification information and further store the user terminal identification information.

The second memory 230 may store the big data. The big data may be updated periodically.

FIG. 8 is a control flowchart of a vehicle according to an exemplary embodiment of the present disclosure.

When receiving the start ON command (or the booting ON command), the vehicle receives the SoC information of the battery from the battery management device 160 and displays the received SoC information of the battery through the vehicle terminal 170 or the cluster.

The vehicle may communicate with at least one of the server 2, the infrastructure 3, and the user terminal 4 in response to the ON command of the remote service mode while traveling.

The vehicle may also communicate with the home terminal in response to the ON command of the remote service mode while traveling.

While the remote service mode is performed, the vehicle may transmit the control information input to the input device 171 in response to the home control mode to the home terminal and display the operation information of various electronic devices in the home received from the home terminal through the display 172.

While the remote service mode is performed, the vehicle may display the news information received from the server 2 in response to the news provision mode through the display 172, receive the route information from the server 2 in response to the navigation mode, and display the navigation information through the display 172 based on the received route information. Here, the navigation information may include map information, route information, departure information, current position information, destination information, road environment information, and the like.

The vehicle may transmit various use information through the remote service mode while the vehicle travels to the server 2.

When receiving the start OFF command, the vehicle may obtain the SoC information of the battery and display the obtained SoC information of the battery through at least one of the display 172 and the cluster.

When receiving the start OFF command (301), the vehicle may perform a parking mode (302) and activate the remote service mode (303).

In the parking mode, the vehicle may control the battery management device 160 to supply power to a plurality of electronic devices based on preset option information. Here, the preset option information may include identification information of an electronic device which needs to supply power when the vehicle is in the parking mode.

The vehicle may control the battery management device 160 to monitor the SOC value of the battery in the parking mode (304).

The vehicle may determine whether the charged amount of the battery is lower than or equal to the preset charged amount based on the received SoC information of the battery when receiving the SoC information of the battery from the battery management device 160 (305) and transmit the power supply cut-off notification information of the battery to the user terminal 4 when the charged amount of the battery is lower than or equal to the preset charged amount (306). At the instant time, the user terminal 4 may receive the battery power supply cut-off notification information and display the received power supply cut-off notification information of the battery.

The power supply cut-off notification information of the battery may include the guide information for guiding the power supply cut-off of the battery and the time information on the power supply cut-off of the battery.

Here, the time information of the power supply cut-off of the battery may vary depending on whether the current time is included in the use time zone of the remote service. This will be described in more detail.

In the parking mode, the vehicle may perform the remote service by controlling the operation of at least one electronic device in response to various control commands received from the user terminal 4.

For example, in the parking mode, the vehicle may control the start attempt when receiving the start ON command from the user terminal 4, control the door to be unlocked when receiving the door unlock command from the user terminal 4, control the ON operation of the air conditioner when receiving the ON command and target temperature information of the air conditioner from the user terminal 4, and control the operation of the air conditioner so that the temperature of the air inside the vehicle reaches the target temperature.

In the parking mode, the vehicle may confirm the date and time when the control command of at least one electronic device has been received when receiving the control command of the at least one electronic device from the user terminal 4, store the checked date and time as the use time information of the remote service, store the control command as the control information together, and also store the identification information of the user terminal 4 transmitting the control command.

The vehicle may transmit the use information of the remote service for the remote service mode in the parking mode to the server 2 (307). Here, the use information of the remote service may include the control information, the use time information, and the user terminal identification information.

Furthermore, the vehicle may also transmit the use information of the remote service for the remote service mode while traveling to the server.

The vehicle may also transmit the use information of the remote service while parked to the server 2 at the time point when the vehicle is turned on, transmit the use information of the remote service while parked to the server 2 in a certain period, and transmit the use information of the remote service while parked to the server 2 in response to the user input.

The vehicle may also store the use information of the remote service. In the instant case, the vehicle may obtain the use time information of the remote service based on the stored use information of the remote service and store the obtained use time information of the remote service. Thereafter, when the vehicle is in the parking mode and the charged amount of the battery is lower than or equal to the preset charged amount, the vehicle may adjust the cut-off time point of the power supply of the battery based on the stored use time information of the remote service.

When receiving the SoC information of the battery from the battery management device 160 while parked, the vehicle may determine whether the charged amount of the battery is lower than or equal to the preset charged amount based on the received SoC information of the battery and control the first communicator 180 to transmit the power supply cut-off notification information of the battery to the user terminal 4 when it is determined that the charged amount of the battery is lower than or equal to the preset charged amount. At the instant time, the user terminal 4 may receive the battery power supply cut-off notification information and display the received power supply cut-off notification information of the battery.

Here, the battery power supply cut-off notification information may include the guide information for guiding the power supply cut-off of the battery and the time information of the power supply cut-off of the battery.

The vehicle may receive the big data on the use of the remote service through the server 2, analyze the received big data (308) to obtain the use information of the remote service used by the user, and obtain the use time information of the remote service from the obtained use information (309).

The vehicle may also transmit the provision request information of the big data to the server 2 when the charged amount of the battery while parked is lower than or equal to the preset charged amount and receive the big data through the server 2.

When analyzing the received big data, the vehicle may analyze the use time of the remote service used by the user when the vehicle is in the parking mode.

The vehicle may also directly receive the use time information of the remote service through the server 2.

When obtaining the use time information from the big data received through the server 2 or receiving the use time information through the server 2, the vehicle may obtain the use time zone when the remote service is used based on the use time information.

The use time zone when the remote service is used may be a time when the remote service is used a preset number of times or more for a preset period or may range from a time point before a predetermined time period from the use time to a time point after the predetermined time period from the use time.

The vehicle determines whether the current time is included in the use time zone based on the current time information and the use time information (310), counts the time from the current time point when it is determined that the current time is not included in the use time zone, and transmits the power supply cut-off command of the battery to the battery management device 160 at the time point when the counted time elapses the set time so that the power supply of the battery is cut off (311).

When it is determined that the current time is included in the use time zone, the vehicle transmits the power supply cut-off command of the battery to the battery management device 160 when the additional time elapses from the set time from the current time point so that the power supply of the battery is cut off (312).

Here, the additional time may be determined in response to the amount of power required for starting the vehicle (i.e., the required charged amount). In other words, the additional time A may be a time required for consuming the charged amount corresponding to the difference between the preset charged amount and the required charged amount.

The time required for consuming the charged amount may be obtained from the charged amount information of the battery, the current information of the battery, the voltage information of the battery, the temperature information of the battery, and the pre-stored discharge output map.

The vehicle may adjust the standby time until the cut-off time point of the power supply of the battery to be longer in a case in which the current time is included in the use time zone of the remote service than in a case in which the current time is not included in the use time zone.

Furthermore, the vehicle may also count the time from the current time point when it is determined that the current time is not included in the use time zone of the remote service and determine whether the counted time has elapsed the set time and directly control the battery 110 to cut the power supply of the battery off at the time point when the counted time elapses the set time when it is determined that the counted time has elapsed the set time.

Furthermore, when it is determined that the current time is included in the use time zone, the vehicle may also directly control the battery 110 to cut the power supply of the battery off at the time point when the additional time elapses from the set time from the current time point.

When the time for cutting off the power supply of the battery is determined, the vehicle may also transmit the power supply cutoff notification information of the battery to the user terminal.

The vehicle may also primarily transmit notification information notifying that the charged amount of the battery is lower than or equal to the preset charged amount and secondarily transmit the power supply cut-off notification information of the battery to the user terminal when the time for cutting off the power supply of the battery is determined.

Meanwhile, the disclosed exemplary embodiments of the present disclosure may be implemented in a form of a recording medium storing instructions executable by a computer. The instructions may be stored in a form of program code, and may generate program modules to perform the operations of the disclosed exemplary embodiments when executed by a processor. The recording medium may be implemented as a computer-readable recording medium.

The computer-readable recording medium includes all types of recording media in which the instructions readable by the computer are stored. For example, the recording medium may include read only memories (ROMs), random access memories (RAMs), magnetic tapes, magnetic disks, flash memories, optical data storage devices, and the like.

According to an exemplary embodiment of the present disclosure, it is possible to minimize the restriction of the use of a remote service in a time zone when a user frequently utilizes the remote service by adjusting a cut-off time point of power supply of a battery based on big data on the use of the remote service.

According to an exemplary embodiment of the present disclosure, it is possible to allow the user to conveniently use the remote service, improving the user's satisfaction.

According to an exemplary embodiment of the present disclosure, it is possible to allow the user to start the vehicle without difficulty by preventing the power supply of the battery from being cutting off in the time zone when the user frequently utilizes the remote service.

According to an exemplary embodiment of the present disclosure, it is possible to allow the user to easily recognize power supply cut-off notification information of the battery of a parked vehicle anytime and anywhere by outputting the power supply cut-off notification information of the battery through a user terminal when the vehicle is in the parked state.

According to an exemplary embodiment of the present disclosure, it is possible to improve the quality and merchantability of the vehicle, furthermore, increase the user satisfaction, improve the user convenience and safety of the vehicle, and secure the competitiveness of a product.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
   a battery;
   a memory;
   a battery management apparatus configured to monitor a state of charge (SOC) value of the battery; and
   a processor communicatively connected to the battery management apparatus and configured to:
      receive SoC information of the battery from the battery management apparatus when the vehicle is in a parked state;
      determine whether a charged amount of the battery is lower than or equal to a preset charged amount based on the received SoC information of the battery;
      determine whether a current time is included in a use time zone of a remote service based on use time information of the remote service stored in the memory when the processor concludes that the charged amount of the battery is lower than or equal to the preset charged amount, the use time information of the remote service being obtained based on big data received from a server;
      adjust a cut-off time point of power supply of the battery in response to whether the current time is included in the use time zone of the remote service;
      calculate the cut-off time point of the power supply of the battery by identifying an additional time required for starting the vehicle through a pre-stored discharge output map, when the current time is included in the use time zone of the remote service;
      transmit a command to cut off the power supply of the battery to the battery management apparatus,
      wherein the processor is configured to transmit information on the cut-off time point of the power supply including the additional time to a user terminal.

2. The vehicle of claim 1, wherein the processor is configured to adjust a standby time from the current time to the cut-off time point of the power supply of the battery to be longer in a case in which the current time is included in the use time zone of the remote service than in a case in which the current time is not included in the use time zone of the remote service.

3. The vehicle of claim 1, further including a communicator, wherein the processor is configured to control the communicator to transmit the received SoC information of the battery to the user terminal, and when the processor concludes that the charged amount of the battery is lower than or equal to the preset charged amount, to control the communicator to transmit power supply cut-off notification information of the battery to the user terminal.

4. The vehicle of claim 3,
   wherein, when the processor concludes that the current time is not included in the use time zone of the remote service, the processor is configured to count a time from a time point when the power supply cut-off notification information of the battery is transmitted, and when the counted time elapses a set time, to transmit the power supply cut-off command of the battery to the battery management apparatus, and
   wherein, when the processor concludes that the current time is included in the use time zone of the remote service, the processor is configured to count the time from the time point when the power supply cut-off notification information of the battery is transmitted, and when the counted time elapses the set time and the additional time, to transmit the power supply cut-off command of the battery to the battery management apparatus.

5. The vehicle of claim 4, wherein the additional time is determined using the preset charged amount and a charged amount required for starting the vehicle.

6. The vehicle of claim 1, further including a switch connected to the battery,
   wherein the battery management apparatus is configured to control an OFF operation of the switch to cut the power supply of the battery off.

7. The vehicle of claim 1, further including:
   a communicator configured to perform communication with the server,
   wherein the processor is configured to receive the use time information of the remote service from the server and to store the received use time information of the remote service in the memory.

8. The vehicle of claim 1, further including:
   a communicator configured to perform communication with the server,
   wherein the processor is configured to receive the big data from the server, to obtain use information of the remote service based on the received big data, to obtain the use time information of the remote service based on the obtained use information of the remote service, and to store the obtained use time information of the remote service in the memory.

9. The vehicle of claim 1, further including:
   a communicator configured to perform communication with the server,
   wherein the processor is configured to receive use information of the remote service from the server, to obtain the use time information of the remote service based on the received use information of the remote service, and to store the obtained use time information of the remote service in the memory.

10. The vehicle of claim 1, further including:
a communicator configured to perform communication with the user terminal and the server,
wherein the processor is configured to control a remote service mode using the user terminal and to transmit use information of the remote service while the remote service mode is performed to the server.

\* \* \* \* \*